Figure 4:
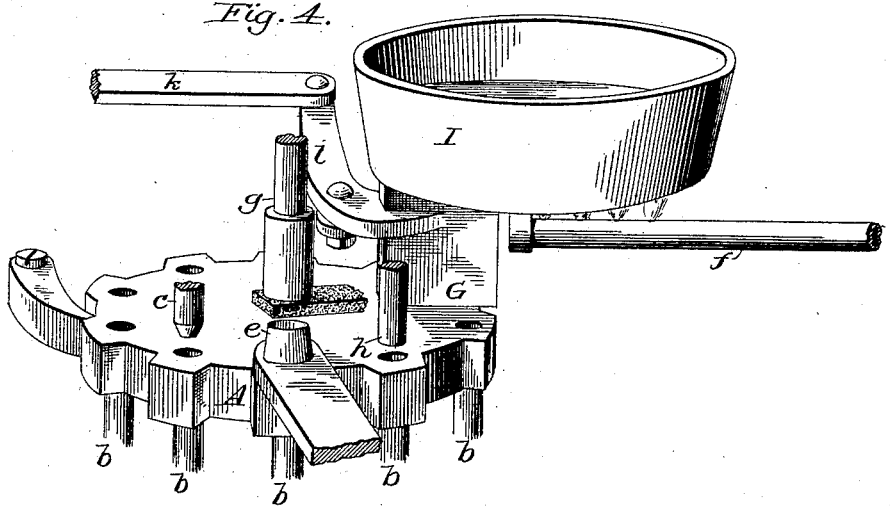

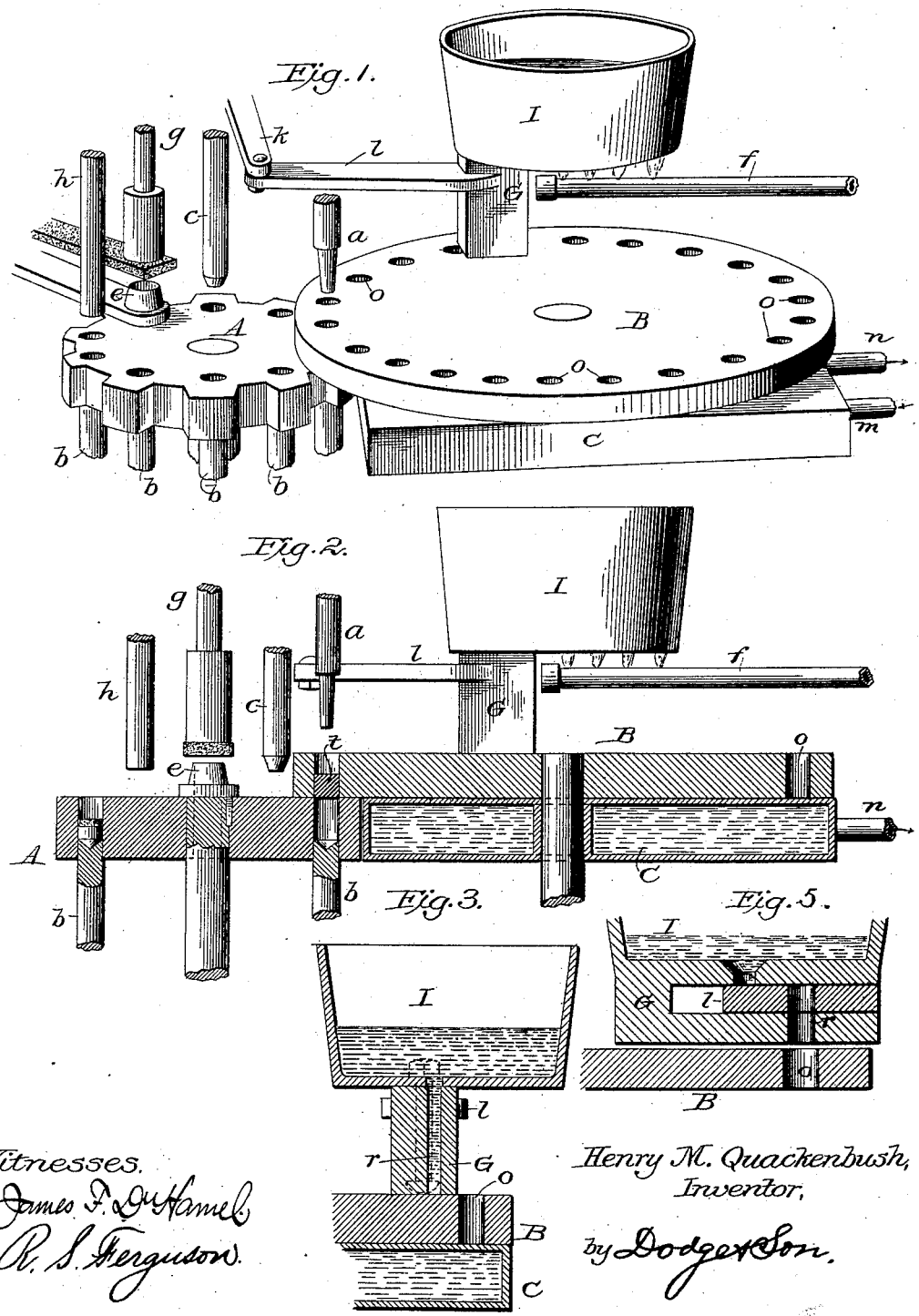

(No Model.) 2 Sheets—Sheet 2.

H. M. QUACKENBUSH.
APPARATUS FOR MANUFACTURING PROJECTILES.

No. 358,984. Patented Mar. 8, 1887.

Witnesses:
James P. DuHamel
R. S. Ferguson

Henry M. Quackenbush,
Inventor,
by Dodge & Son.

UNITED STATES PATENT OFFICE.

HENRY MARCUS QUACKENBUSH, OF HERKIMER, NEW YORK.

APPARATUS FOR MANUFACTURING PROJECTILES.

SPECIFICATION forming part of Letters Patent No. 358,984, dated March 8, 1887.

Application filed December 31, 1886. Serial No. 223,134. (No model.)

*To all whom it may concern:*

Be it known that I, HENRY MARCUS QUACKENBUSH, of Herkimer, in the county of Herkimer and State of New York, have invented certain new and useful Improvements in Apparatus for Manufacturing Projectiles, of which the following is a specification.

This invention relates to the manufacture of felted slugs for use in air-guns; and the invention consists in an apparatus for melting the lead and delivering the same in suitable quantities to a carrying-disk and then swaging and felting the same, as hereinafter more fully described.

Figure 1 is a perspective view of the apparatus. Figs. 2 and 3 are transverse vertical sections of the same. Fig. 4 is a perspective view of the same in a modified form, and Fig. 5 a modified detail.

This invention is an improvement on or addition to the apparatus for manufacturing air-gun projectiles described in Patent No. 290,230, granted to Haviland and Gunn, December 18, 1883. As will be seen by reference to said patent, the slug or projectile in that case was formed by taking a shot of proper size and swaging it to the desired form by means of suitable punches, and then cutting out and securing to it a disk of felt by means of other punches, in connection with a bed-plate provided with suitable holes for the punches to work in. So far as the swaging and felting of the slug is concerned, I make use of the methods described in said patent; but instead of using the prepared shot as blanks, from which to form the slugs, I use molten lead to form the blanks, and for that purpose I proceed as follows:

I provide a receptacle, I, for melting the lead, and which may be heated by gas-jets from a pipe, $f$, as shown in Figs. 1 and 2, or by any equivalent means. Below this, on a suitable frame, (not shown,) I locate a rotating disk, B, having a series of holes, $o$, for the reception of the melted lead that is to form the blanks; and for the purpose of cooling this disk and the blanks therein I mount this disk B upon a hollow metal block or table, C, through the interior of which cold water is caused to pass by means of pipes $m$ and $n$, as indicated in Figs. 1 and 2, this disk or dial B being intended merely to receive the melted lead, hold it until cooled to form the blanks $t$, as shown in Fig. 2, and then carry them around over another disk or dial, A, which is provided with a series of holes containing the swaging-punches $b$, as shown in Fig. 2, there being a punch, $a$, arranged at the proper point to shove the blank $t$ from the dial B down into the hole in the dial A, as shown in Figs. 1 and 2.

In order to conduct the lead from the kettle or furnace I to the dial B, and at the same time regulate the quantity delivered, so as to make the blanks, and consequently the projectiles, of uniform size, I pivot to the under side of the kettle I a block, G, which, as shown in Fig. 3, has a hole, $r$, extending lengthwise through it, the block G being pivoted eccentrically, so that when it is turned to one position its hole $r$ will register or coincide with a hole in the bottom of the kettle, as shown in Fig. 3, and which of course will permit the molten lead to flow into and fill the hole $r$, but which is prevented from dropping out by disk B, which at that instant is in such a position that the solid metal between the holes $o$ is opposite the bottom of hole $r$ and closes the same, as shown in Fig. 3.

When the hole $r$ is filled, the block G is turned on its pivot, which movement closes the hole in the bottom of the kettle I and at the same time brings the hole $r$ in line with or directly over the hole $o$ in dial B, when the melted lead passes from the hole $r$ into the hole $o$ in dial B, where it cools and forms the blank $t$, as shown in Fig. 2.

It will of course be understood that the hole $r$ in block G will be made of such a size or capacity as to contain the requisite quantity of lead to form a blank of the size required, and thus the block G is made to serve not only as a means of conducting the molten lead from the kettle to the dial, but also to measure the quantity delivered at each movement. As shown in Figs. 1 and 2, the block G is provided with an arm, $l$, pivoted to a rod, $k$, which is operated by a crank or cam, (not shown;) or it may be operated by hand, if preferred.

To complete the projectile, I use the means described in the patent hereinbefore referred to so far as the swaging-punches $b$ and $c$, the cutting-die e, and punch g, and the punch h are concerned; but in order to render the operation continuous and enable it to be done by power I provide a second dial, A, and arrange it in relation to the dial B, as shown, so that when the blank has been formed, as above described, it will be transferred from the dial B to the dial A, and be therein completed by successive operations of the various punches.

It will of course be understood that the dials will be given an intermittent movement, and that the movement of the punches and the other moving parts of the apparatus will be timed in relation one to another, as is customary in machines of this character—such, for instance, as are in common use in the manufacture of metallic cartridges and similar articles, and which, being well known to those skilled in the art, need not be herein described.

In Fig. 4 I have shown the melting-pot with its conductor G applied direct to the dial A, as it obviously may be, and be made to operate the same; but I prefer to use the additional dial B and the means for cooling the same, as it will enable the machine to be operated more rapidly. So, too, it is obvious that, instead of pivoting the conductor G so as to turn to open and close communication with the pot I and the hole in the dial, it may be made to slide to and fro, or a separate slide, t, may be used, as shown in Fig. 5, to measure the quantity and close and open communication between the melting-pot and dial, it being merely a matter of choice for the mechanic as to which is the cheaper or simpler to construct.

One great advantage of this invention is that, instead of being compelled to use the prepared shot for blanks, it enables one to use scrap-lead, which is a much cheaper material. By applying it to an organized machine, as proposed, the slugs can be formed with great rapidity, and consequently much more cheaply. It is obvious, also, that any form or size of lead projectile can be made in this way, it only being necessary to change the form of the ends of the punches b and c to conform to the desired form of the projectile, and to omit the devices used for cutting and applying the felt when it is desired to form projectiles without the felt attached.

Having thus described my invention, what I claim is—

1. In combination with the dial B, provided with a series of holes, o, the melting-pot I, and the perforated conductor or block G, said parts being constructed and arranged in relation to each other substantially as and for the purpose set forth.

2. In combination, the melting-pot I, the measuring-conductor G, the perforated dial B, and the dial A, provided with a series of punches, b, and the punch a, all arranged to operate substantially as described.

3. In combination with a melting-pot, I, conductor G, and dial B, the hollow supporting block or table C, for cooling the dial and the blanks therein, as set forth.

4. The combination, in a machine for forming soft-metal projectiles, a melting-pot, I, a conductor, G, a dial, A, with suitable punches for swaging the projectile while held therein, (with or without the intermediate dial, B, and cooling device C,) said parts being constructed and arranged for joint operation, substantially as shown and described.

HENRY MARCUS QUACKENBUSH.

Witnesses:
CHAS. H. BURRILL,
L. A. LAWTON.